(12) United States Patent
Huang et al.

(10) Patent No.: US 8,930,841 B2
(45) Date of Patent: Jan. 6, 2015

(54) METHODS AND APPARATUS FOR A USER INTERFACE CONFIGURED TO DISPLAY EVENT INFORMATION

(75) Inventors: Chen Je Huang, Chicago, IL (US); Gillian A. Fry, Chicago, IL (US); Carol E. Lee, Streamwood, IL (US)

(73) Assignee: Motorola Mobility LLC, Libertyville, IL (US)

( * ) Notice: Subject to any disclaimer, the term of this patent is extended or adjusted under 35 U.S.C. 154(b) by 500 days.

(21) Appl. No.: 13/027,769

(22) Filed: Feb. 15, 2011

(65) Prior Publication Data

US 2011/0202866 A1    Aug. 18, 2011

Related U.S. Application Data

(60) Provisional application No. 61/304,633, filed on Feb. 15, 2010.

(51) Int. Cl.
| | | |
|---|---|---|
| G06F 3/048 | (2013.01) | |
| G06F 3/0485 | (2013.01) | |
| G06F 3/0488 | (2013.01) | |
| G06F 3/0482 | (2013.01) | |

(52) U.S. Cl.
CPC ............ *G06F 3/0482* (2013.01); *G06F 3/0485* (2013.01); *G06F 2203/04806* (2013.01); *G06F 3/04883* (2013.01)
USPC ............................. 715/779; 715/764; 715/700

(58) Field of Classification Search
CPC ...................................................... G06F 3/048
USPC ........................................ 715/779, 764, 700
See application file for complete search history.

(56) References Cited

U.S. PATENT DOCUMENTS

| | | | |
|---|---|---|---|
| 2007/0060205 A1* | 3/2007 | Kim ............................... | 455/566 |
| 2008/0109762 A1* | 5/2008 | Hundal et al. ................. | 715/855 |
| 2008/0209546 A1* | 8/2008 | Kim ................................ | 726/19 |
| 2009/0006475 A1* | 1/2009 | Udezue et al. ............. | 707/104.1 |
| 2010/0070888 A1* | 3/2010 | Watabe et al. ................ | 715/760 |

* cited by examiner

*Primary Examiner* — Tadeese Hailu
*Assistant Examiner* — Darrin Hope
(74) *Attorney, Agent, or Firm* — Shumaker & Sieffert, P.A.

(57) ABSTRACT

An embodiment of a user interface of an electronic device is configured to display user interface elements along a timeline. Each displayed user interface element is associated with an event that is characterized by one or more event attributes. The event attributes include a temporal attribute (e.g., a date and/or time). Each user interface element is relatively positioned along the timeline based on its temporal attribute, and each user interface element is displayed with a visual representation of a set of its associated event attributes. The displayed set of event attributes for a particular user interface element is determined based on a position of the user interface element along the timeline and/or a spatial zoom level at the time. The spatial zoom level and/or position along the timeline of each user interface element may be modified based on user inputs.

20 Claims, 10 Drawing Sheets

METHODS AND APPARATUS FOR A USER INTERFACE CONFIGURED TO DISPLAY EVENT INFORMATION

RELATED APPLICATION

This application claims priority to provisional application Ser. No. 61/304,633, filed on Feb. 15, 2010.

TECHNICAL FIELD

The subject matter described herein generally relates to user interfaces used in conjunction with displaying event information on electronic devices.

BACKGROUND

Touch systems, such as touchscreen displays, touch pads, and the like, have become an increasingly popular type of input/output device, and are often used in connection with smartphones, e-book readers, table computers, and other such computing devices. At the same time, the advent of social networking sites, along with the increased use of e-mail, on-line calendars, RSS (Really Simple Syndication) feeds, and other such services, has greatly increased the amount of data that a user must deal with on a day-to-day basis.

One potentially voluminous type of data includes notifications relating to various events, such as the receipt of an SMS (Short Message Service) message, a status update on a social networking site, a received email, a scheduled appointment, and so on. Given the number of such events within a typical day, it can be difficult for a user to effectively display and explore past and present event information using currently-known display based (e.g., touchscreen) user interfaces.

Accordingly, there is a need for improved user interfaces for interacting with mobile devices, touchscreen-based systems, computing devices, and other display-based systems. Other desirable features and characteristics of the present embodiments will become apparent from the subsequent detailed description and the appended claims, taken in conjunction with the accompanying drawings and the foregoing technical field and background.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

In general, embodiments of the present invention relate to a touch system user interface wherein a plurality of user interface elements are displayed along a timeline, including a visual representation of a displayed set of the event attributes. The user interface elements are positioned along the timeline based on a temporal event attribute. The position and/or spatial zoom level of the user interface elements are modified in response to user inputs (e.g., panning, zooming, and so on), and the displayed set of event attributes is defined based on the spatial zoom level.

As a preliminary matter, it will be appreciated that the user interface methods described below may be implemented in a variety of electronic devices, including, for example, cellular phones (e.g., "smartphones"), personal data assistants (PDAs), Global Positioning System (GPS) or other geolocation or navigation devices, e-book readers, portable entertainment devices, computers (e.g., desktop, laptop, notebook, tablet, and netbook computers), point-of-sale devices, gaming devices, pen pads, and any other electronic apparatus that may include a display or touchscreen system.

Figure 1:
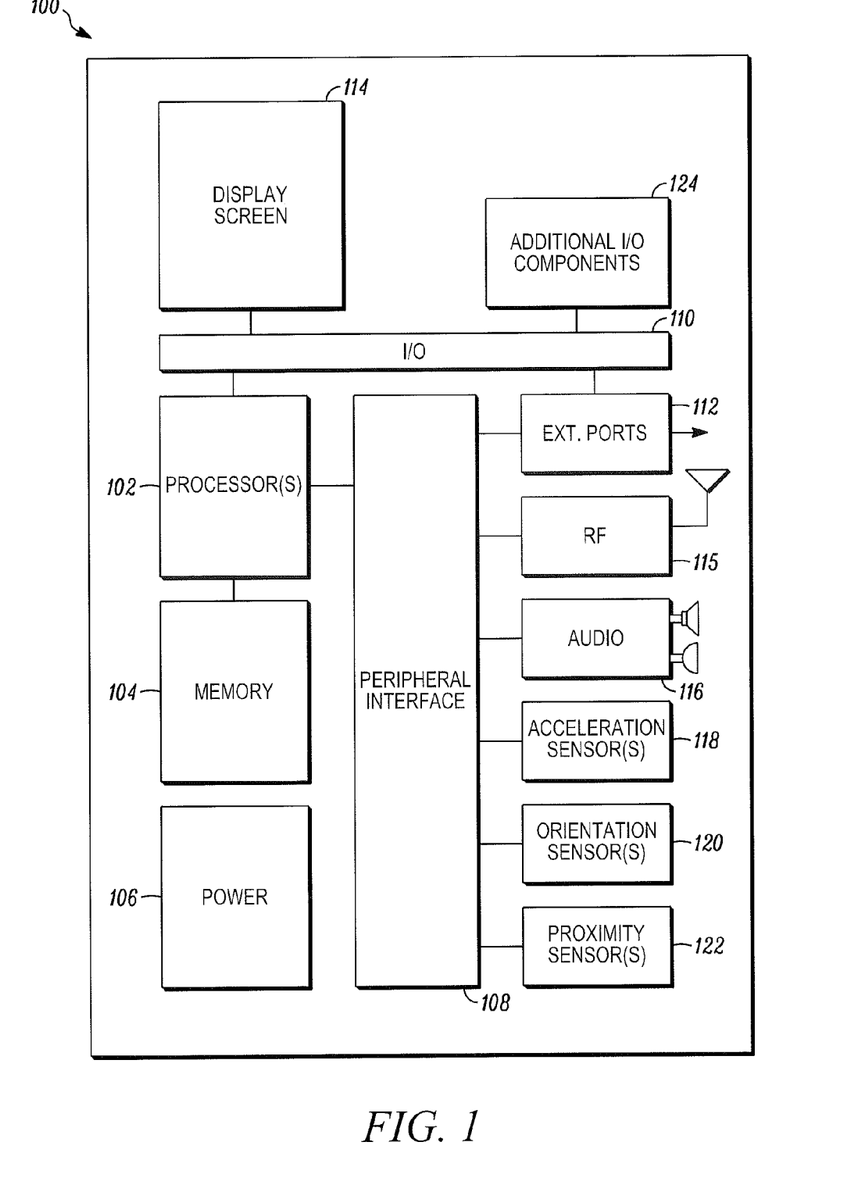
FIG. 1 illustrates an electronic device in which a user interface method may be implemented, according to an embodiment.

FIG. 1 illustrates an electronic device 100 in which a user interface method may be implemented, according to an embodiment. Device 100 includes one or more microprocessors 102, one or more memory devices 104 (e.g., flash memory, hard drives, MicroSD cards, and so on), a power module 106 (e.g., batteries, charging circuits, and so on), a peripheral interface 108, one or more external ports 112 (e.g., Universal Serial Bus (USB), Firewire, and so on), an RF transceiver module 115 (e.g., which functions in accordance with an IEEE 802.11, Zigbee, or other standard), an audio module 116, one or more sensors (e.g., acceleration sensors 118 (e.g., three-axis sensors), orientation sensors 120, and proximity sensors 122), an input/output (I/O) controller 110, display screen 114 (e.g., a touchscreen), and additional I/O components 124 (e.g., keys, buttons, lights, LEDs, cursor control devices, microphones, speakers, haptic devices, and so on). Display screen 114 and additional I/O components 124 may be considered to form portions of a user interface (e.g., portions of device 100 associated with presenting information to the user and/or receiving inputs from the user). In any given embodiment, more, fewer, or different ones of such electronic components may be present in an electronic device.

Display screen 114 is a touchscreen display, in an embodiment, which is configured to interact with various manipulators, such as a human finger or a stylus. Each type of manipulator, when brought into contact with or close proximity to display screen 114, causes display screen 114 (and/or a display driver associated with display screen 114) to produce a signal that can be received and interpreted as a touch event by processor 102. Processor 102 is suitably configured (through any combination of hardware and software components) to determine the location of the contact on the surface of touchscreen 114, as well as other selected attributes of the touch event (e.g., movement of the manipulator(s) across the surface of the screen, directions and velocities of such movement, touch pressure, touch duration, and so on).

In an embodiment in which display screen 114 is a touchscreen display, display screen 114 may include a thin, transparent touch sensor component superimposed upon a display (e.g., a Liquid Crystal Display (LCD) or other type of display) that is viewable by a user. Examples of such displays include capacitive displays, resistive displays, surface acoustic wave (SAW) displays, optical imaging displays, and the like. Display 114 or one of the additional I/O components 124 may also provide haptic feedback to the user (e.g., a clicking response or keypress feel) in response to a touch event. Embodiments contemplate any suitable touch sensitive surface or sensor. In alternate embodiments, display screen 114 may be replaced with a display screen that does not include a touch sensitive surface or sensor, and a user may select locations or areas of the display screen by moving a displayed cursor to such locations or areas using a cursor control device or another type of user input, and selecting the locations or areas (e.g., with a cursor click).

Display screen 114 may have any suitable rectilinear or curvilinear shape, and may be oriented in any desired fashion. The illustrated embodiments, without loss of generality, depict rectangular regions oriented in a portrait or landscape orientation (i.e., with respect to a user holding the device). However, embodiments of the present invention comprehend any range of shapes, sizes, and orientations for display screen 114.

In general, a computer program product in accordance with an embodiment comprises a computer usable storage medium (e.g., standard random access memory (RAM), an optical disc, a universal serial bus (USB) drive, or the like) having computer-readable program code embodied therein, wherein the computer-readable program code is adapted to be executed by processor 102 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and so on).

FIGS. 2-5 illustrate example screen shots of a timeline/event depiction that may be rendered on a display screen (e.g., display screen 114, FIG. 1) in accordance with an exemplary embodiment, showing progressive changes in a spatial zoom level. As used herein, the term "spatial zoom level" means an angle of view of a displayed timeline, which corresponds to a temporal range. According to various embodiments, the particular spatial zoom level in effect at a given time may be dependent on a time duration of a portion of a timeline that a user has selected for display. For example, a relatively low spatial zoom level may correspond to display of a portion of a timeline that corresponds to a week, and a relatively high spatial zoom level may correspond to display of a portion of a timeline that corresponds to an hour. The term "spatial zoom level" also or alternatively may be construed to mean a level of magnification or detail of a user interface element, as will be described in more detail later. For example, a relatively low spatial zoom level may correspond to display of relatively few event attributes associated with a user interface element (e.g., a relatively low level of detail), and a relatively high spatial zoom level may correspond to display of a relatively many event attributes associated with a user interface element (e.g., a relatively high level of detail).

As shown in FIGS. 2-5, each screen shot includes one or more user interface elements 213, 215, which are generally distributed along a timeline 210. In the illustrated embodiment, timeline 210 is represented as a generally linear timeline extending across the display screen from left to right (i.e., along the horizontal axis, relative to FIGS. 2-5), and corresponding to a displayed horizontal line 214. Accordingly, events that occur at earlier dates and/or times are presented toward the left side of the timeline 210, whereas events that occur at later dates and/or times are presented toward the right side of the timeline 210. An alternate timeline may extend from right to left in chronology, or the timeline may be non-linear and/or not horizontal.

Either way, each of the user interface elements 213, 215 is associated with a respective event (e.g., the receipt or transmission of an email, an incoming/outgoing/missed telephone call, a social networking notification or post, a calendar event, a text event, a photograph, a video and so on). An "event" is defined as the occurrence of an activity that is detected and indicated by a system, application or program (e.g., a social networking site, a calendar program, a text application, a digital camera, and so on). According to an embodiment, each event is characterized by one or more attributes that may be selected from a group of attributes that includes, but is not limited to, a temporal attribute (e.g., a date and/or time, such as "Today, 5:00 pm"), a location (e.g., "Camelback Mountain"), and a sender identity (e.g., "George"). The number and type of attributes may vary depending upon the nature of the event.

According to an embodiment, user interface elements 213, 215 are rendered on a display (e.g., display screen 114, FIG. 1). Each user interface element 213, 215 may include one or more user interface components. For example, user interface components may include, but are not limited to, text objects, text boxes, buttons, check boxes, radio buttons, static images, video images, animations, icons, navigation icons, widgets, windows, drop-down menus, hyperlinks, and any other interactive or non-interactive graphical element.

Figure 2:
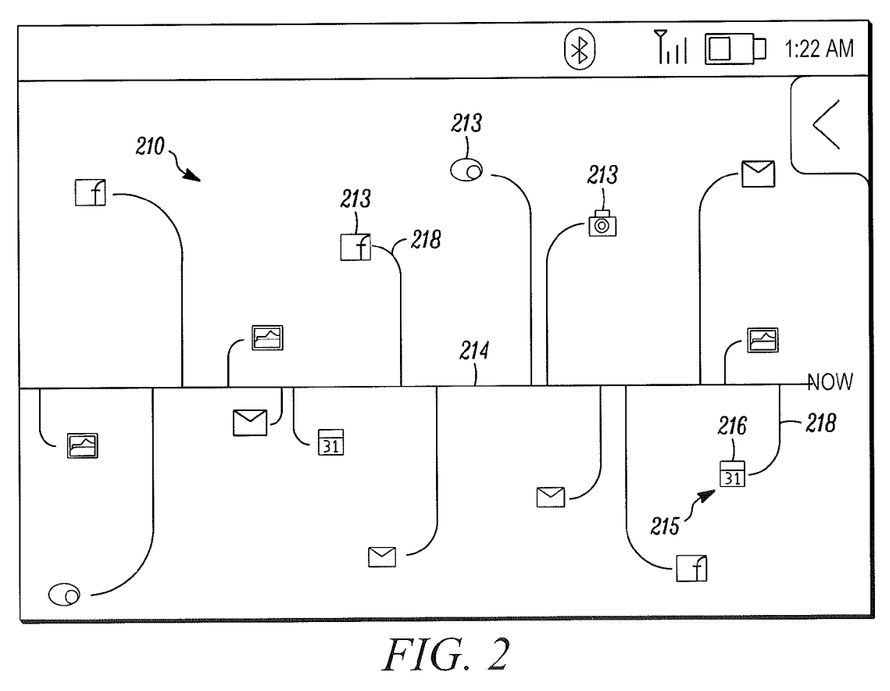
FIGS. 2-5 illustrate example screen shots of a timeline/event depiction that may be rendered on a display screen in accordance with one embodiment, showing progressive changes in spatial zoom level.

Each user interface element 213, 215 is positioned (either directly or indirectly) along the timeline 210 (e.g., along horizontal line 214) based on the temporal attribute associated with the user interface element 213 (e.g., the date and/or time that the event occurred or is scheduled to occur), in an embodiment. In FIG. 2, for example, a plurality of user interface elements 213, 215 are depicted at a first spatial zoom level (e.g., a first level of magnification or detail of the user interface elements 213, 215 and/or a first angle of view of the timeline 210, which corresponds to a first temporal range). Each user interface element 213, 215 at the first spatial zoom level includes an icon 216 and a connector 218. The icon 216 indicates the origin (e.g., the originating application or program) and/or nature of the event (e.g., a social networking site post, an email, a text, a calendar event, a photograph, and so on), in an embodiment. The connector 218 (e.g., a line or curve) connects the icon 216 to horizontal line 214. The intersection of connector 218 with line 214 indicates the temporal attribute of the associated event, with respect to the temporal attributes of other depicted events (e.g., the relative date and/or time that the event occurred or is scheduled to occur). Depending upon the density of the events within any particular displayed segment of timeline 210, the length, curvature, and direction of connectors 218 may vary (e.g., so that the displayed user interface elements 213 or icons associated with events that occur closely in time do not overlap each other on the display screen).

According to an embodiment, the user interface is capable of accepting user inputs (e.g., touches and/or movements on a surface of a touchscreen type of display screen, cursor clicks or movements made using a mouse or other cursor control device, verbal commands from the user, and so on). Information characterizing the user inputs may be sent by the user interface to a processor (e.g., processor 102, FIG. 1), which may, based on the received user inputs, responsively cause the display (e.g., display screen 114, FIG. 1) to display a modified version of the temporal range, position, and/or spatial zoom level of the timeline 210 and/or user interface elements 213, 215. When a user interface includes a touchscreen, such a user input might include, but is not limited to, a "swiping" motion of a manipulator in a particular direction (e.g., up, down, left, right, to effect a panning motion) along the touchscreen, a "pinching" or "spreading" motion of multiple manipulators (e.g., two fingers) on the touchscreen to effect zooming in or out on the timeline 210 (i.e., increasing or decreasing the spatial zoom level), a gestural input on the touchscreen (e.g., the movement of a manipulator in a particular geometrical pattern), one or more tapping inputs of a manipulator on the touchscreen, and so on. When the user interface includes a cursor control device and a display device, such a user input might include, but is not limited to, a movement of the cursor control device, a click of a cursor control device button, a button click and drag of a cursor control device, and so on.

In accordance with an embodiment, each user interface element 213, 215 includes a visual representation of a displayed set of the event attributes, and the displayed set of event attributes is based on the spatial zoom level. As used herein, the term "event attribute" means a descriptive characteristic of an event. For example, but not by way of limitation, event attributes may include a temporal attribute (e.g., a time and date associated with the event), an event type attribute (e.g., calendar event, social networking event, message event, email event, photograph event, video event, and so on), an event name attribute (e.g., a unique or non-unique name for the event), an event originator attribute (e.g., a person or other definable entity that created the event), an event subject attribute (e.g., a person or thing associated with the event), an event location attribute, and other event description attributes (e.g., including various details about an event).

Figure 3:
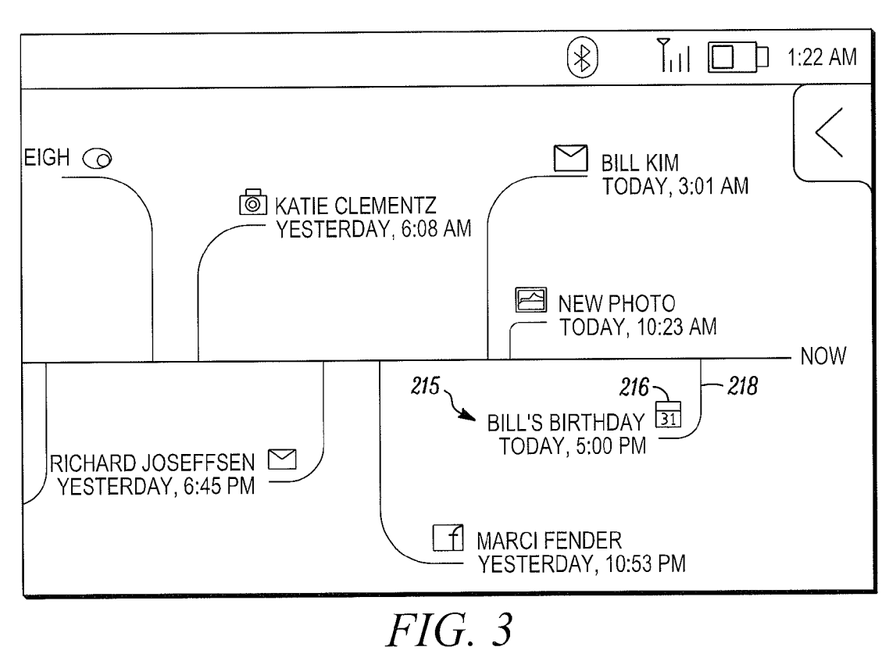
Figure 4:
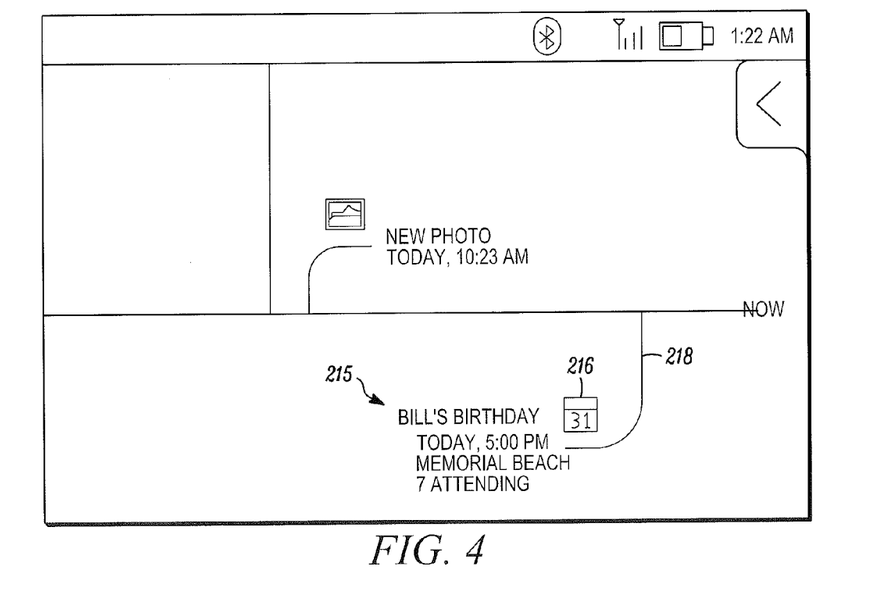
Figure 5:
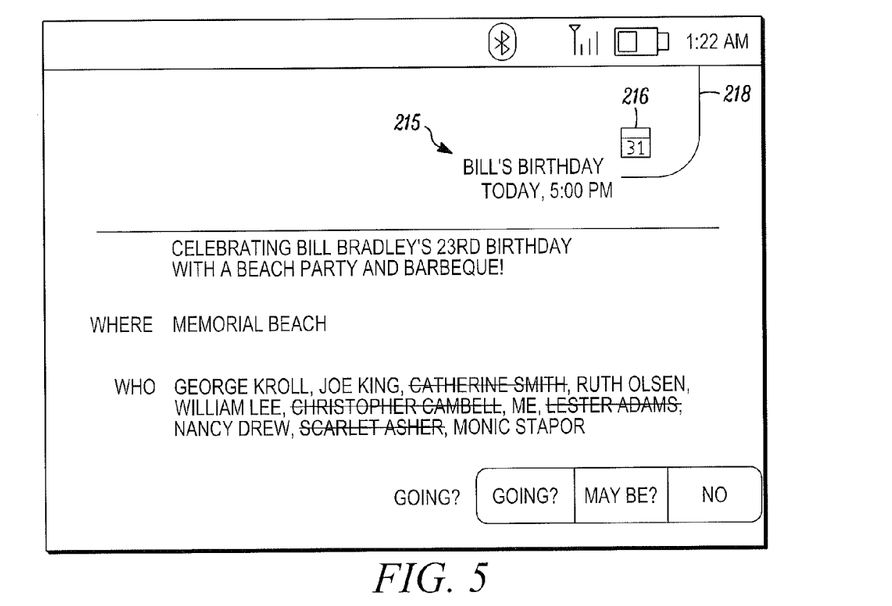

FIGS. 2-5, for example, show portions of a same timeline 210 with progressively higher levels of spatial zoom. As can be seen through the progression of FIGS. 2-5, the displayed set of event attributes changes (e.g., includes more and more displayed attributes) as the spatial zoom level increases. For example, in FIG. 2, which depicts timeline 210 at a relatively low, first spatial zoom level, a particular event may be indicated merely with a user interface element 215 that includes an icon 216 relating to the type attribute of the event (e.g., a calendar event, in the case of user interface element 215). In FIG. 3, which depicts the same timeline 210 at a relatively higher, second spatial zoom level, the displayed attributes for the same event include the icon 216, the name attribute for the event (i.e., "Bill's Birthday"), along with a temporal attribute (i.e., "Today, 5:00 pm"). Similarly, in FIG. 4, which depicts timeline 210 at an even higher, third spatial zoom level, the displayed attributes include the icon 216, the name of the event, the temporal attribute associated with the event, the location attribute for the event (i.e., "Memorial Beach"), and a description attribute that indicates a number of attendees (i.e., "7 attending"). Finally, in FIG. 5, which depicts timeline 210 at a highest, fourth spatial zoom level, an even greater number of attributes associated with the event (e.g., all or substantially all attributes stored in conjunction with the event) are displayed. According to an embodiment, real-time information may be displayed in conjunction with a user interface element 213, 215 for an event (e.g., weather data, traffic information, event updates, and so on), as well as the previously stored attribute information.

While FIGS. 2-5 depict four levels of spatial zoom, the present embodiments are not so limited. The number of spatial zoom levels may be finite and quantized (e.g., five discrete spatial zoom levels or some other number), or the spatial zoom levels may be substantially continuous (e.g., ranging from 50% to 400% zoom, or some other range). In this regard, the term "spatial zoom," as used herein, refers to the effect that visually simulates moving closer to an object in space (or bringing the object closer to the user), rather than simply a "logical" zoom, which may include simply examining more information of an event in response to a tap or click event. The spatial zoom level may be dependent on the temporal range that the user has selected for display. For example, a temporal range may include a portion of the timeline representing a period of minutes, hours, days, weeks, months, or longer periods of time. Accordingly, a relatively low spatial zoom level may involve displaying a portion of a timeline that spans a range of a week, and a relatively high spatial zoom level may involve displaying a portion of the timeline that spans a range of an hour.

While FIGS. 2-5 depict a right-to-left, one dimensional, linear timeline 210, various embodiments of the invention contemplate any type of timeline, which may be depicted using various shapes, dimensionality (e.g., timelines depicted in two or three dimensions). For example, an alternate embodiment may depict a timeline as a parametric curve within a three-dimensional space. Furthermore, in a particular embodiment, the user interface allows the user to configure the interface such that the level of attributes displayed and the graphical nature of the display can be customized with a high level of specificity.

FIGS. 2-5 illustrate that the spatial zoom level and, thus, the angle of view of a displayed timeline may be adjusted based on user inputs. In a further embodiment, the system also may be capable of depicting a two- and/or three-dimensional timeline in which the axis of the timeline is coincident with the intersection of two orthogonal planes (e.g., the timeline is coincident with an x-axis defined by the intersection of an x-y axis (coplanar with the display screen in FIGS. 2-5) and an x-z axis (orthogonal to the display screen in FIGS. 2-5)). In such an embodiment, instead of being restricted to displaying the timeline in a manner in which it appears to be parallel and/or coplanar with the plane of the display screen, the system may be capable of displaying the timeline in a manner in which the timeline appears to be non-parallel (and non-coincident) with the plane of the display screen. In other words, the system may be capable of rotating (i.e., changing the angle), with respect to the plane of the display screen, the x-axis and the two orthogonal planes whose intersection defines the timeline. According to an embodiment, this rotation may be performed by the system in response to user inputs. Accordingly, the system may be configured to enable a user to apparently rotate the displayed timeline in three-dimensional space. This enables a user to view a timeline from various angles. For example, the system may enable the user apparently to rotate the timeline in a manner that the timeline is viewable above, at or below the x-z axis (e.g., from its side, top, and/or bottom). In addition, the system may enable the user apparently to rotate the timeline so that it appears that the user's perspective is from a later time looking backwards toward an earlier time, or from an earlier time looking forward toward a later time. In a further embodiment that facilitates depiction of a two- or three-dimensional timeline, the system also may orient user interface elements along the timeline in two- or three-dimensions, rather than merely orienting and connecting the user interface elements along a one dimensional, linear timeline. For example, the system may display some events as appearing above or below the timeline. In addition, when a timeline is rotated so that the user's perspective is that the timeline is being viewed from above or below the x-z plane, events may appear in front of and/or behind the timeline. This may enable a user to more accurately interpret the temporal relationships between clusters of events even at relatively low spatial zoom levels (e.g., when many events occur close together on the timeline, some events may be depicted above, below, in front of, and/or behind the timeline).

Figure 6:
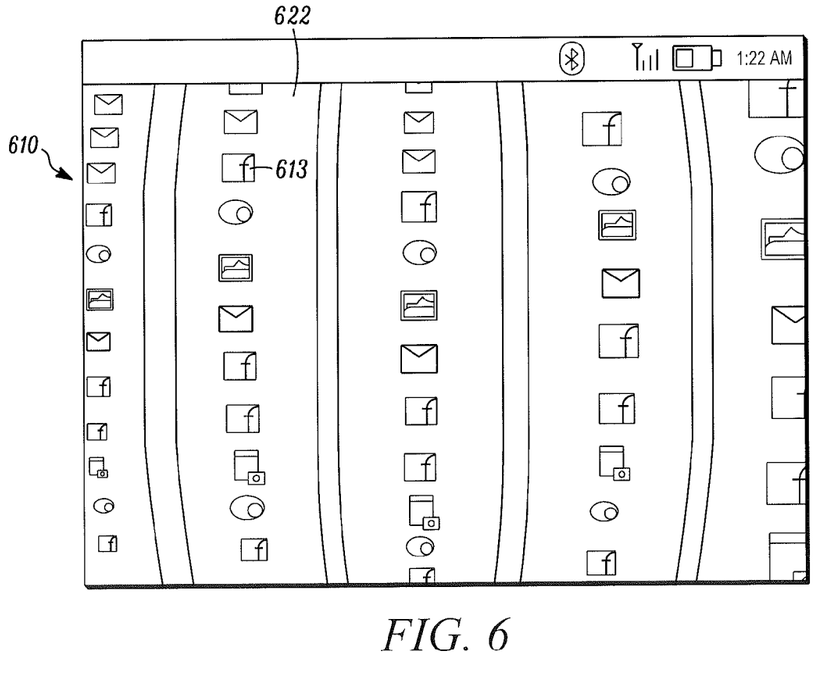
FIGS. 6-8 illustrate example screen shots of a timeline/event depiction in accordance with an alternate embodiment.
Figure 7:
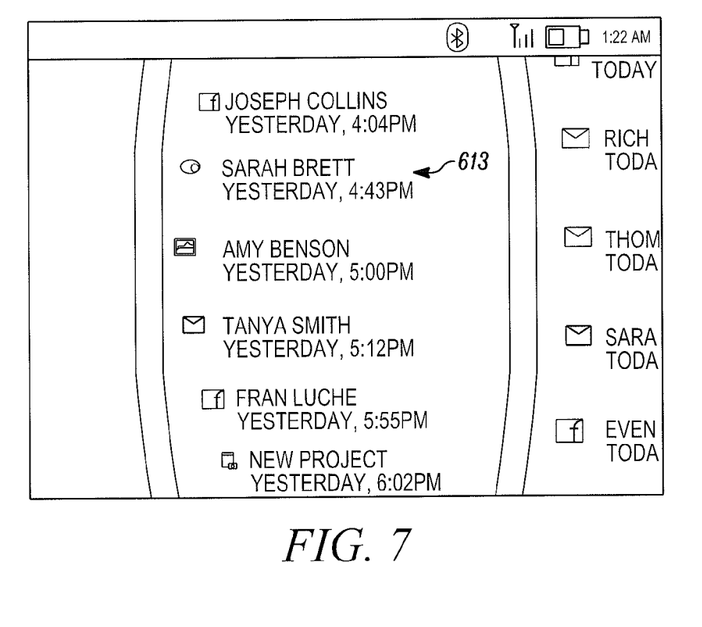
Figure 8:
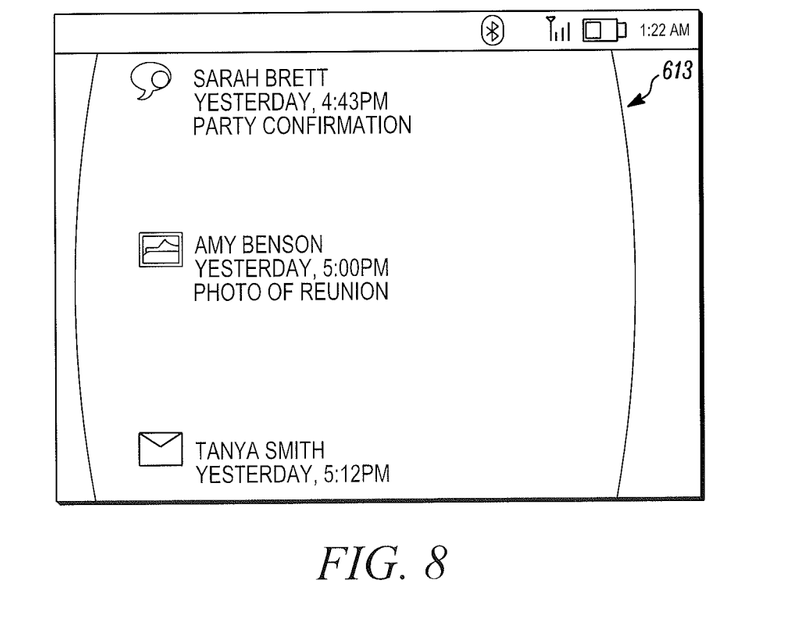

FIGS. 6-8, illustrate example screen shots of a timeline/event depiction in accordance with an alternate embodiment, at progressively higher levels of spatial zoom. In FIGS. 6-8, the user interface elements 613 associated with events are distributed in vertical "strips" 622. The strips 622 are themselves then distributed along a horizontal timeline 610 from left to right. Stated another way, the timeline 610 indicates gross temporal information linearly along the x-axis (e.g., each strip 622 may correspond to a predefined period of time (e.g., 24 hours), and strips 622 toward the left side of timeline 610 correspond to earlier time periods that strips 622 toward the right side of timeline 610), and indicates finer temporal information linearly along a perpendicular y-axis (e.g., within each strip 622, the sequence of events for the time period encompassed by the strip 622 may be arranged in chronological order going down the strip 622). Additional visual effects may be incorporated, such as 3D perspective applied to each strip 622, and so on. As shown in FIGS. 7 and 8, the set of attributes displayed for each element 613 varies depending upon the level of spatial zoom (e.g., more attributes are displayed at relatively higher spatial zoom levels).

Figure 9:
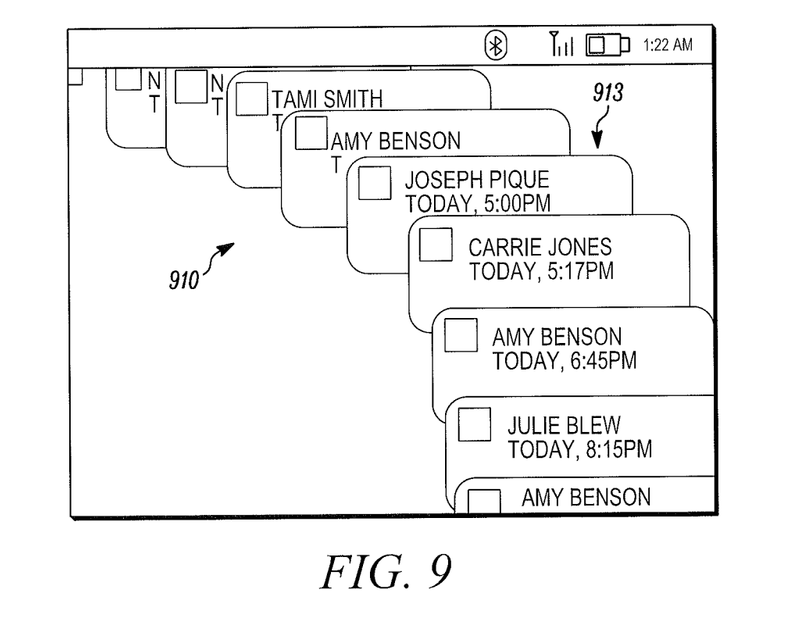
FIGS. 9-11 illustrate example screen shots of a timeline/event depiction in accordance with another alternate embodiment.
Figure 10:
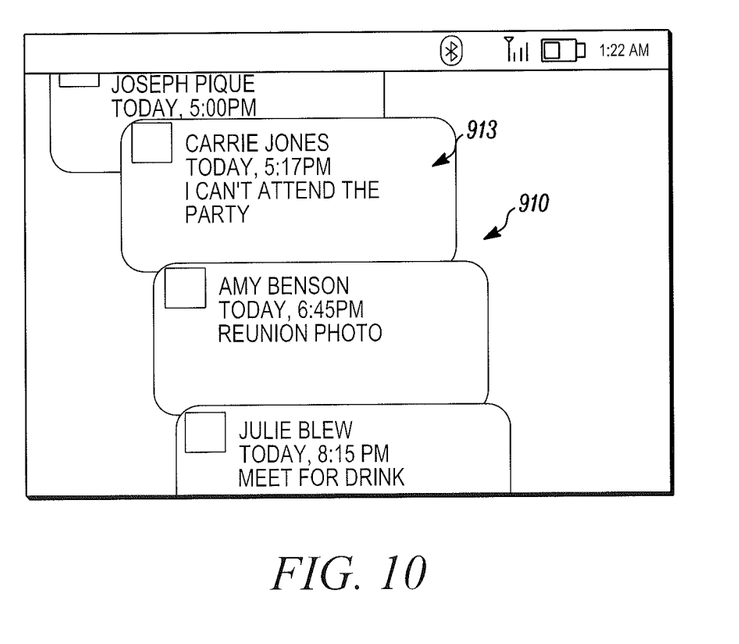
Figure 11:
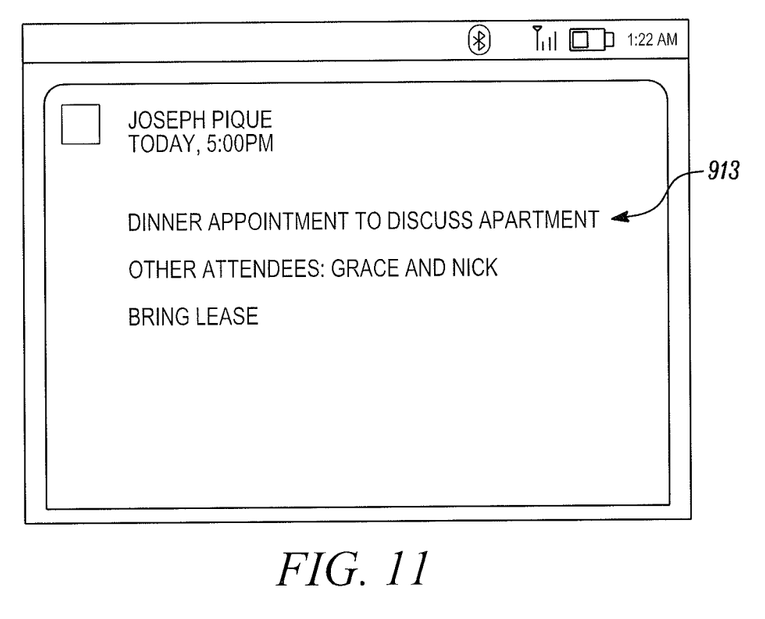

FIGS. 9-11 illustrate example screen shots of a timeline/event depiction in accordance with another alternate embodiment, at progressively higher levels of spatial zoom. In FIGS. 9-11, the user interface element 913 associated with each event is depicted within a rectangular box along timeline 910. In FIG. 9, timeline 910 is shown to extend along an arc path (e.g., arcing from the upper left portion of the screen to the lower right portion of the screen). This gives an appearance of user interface elements 913 associated with temporally older events receding into the distance, and user interface elements 913 associated with temporally newer events appearing closer to the user (e.g., indicating a virtual z-axis). Visual effects such as perspective and fading of the graphics associated with the user interface elements 913 also may be added to suggest depth. In FIG. 10, timeline 910 is shown at a relatively higher spatial zoom level, resulting in a depiction of fewer user interface elements 913 (each depicting more attribute information) along the arc path. Finally, FIG. 11 depicts timeline 910 at an even higher spatial zoom level, at which only a single user interface element 913 (with relatively more attribute information) is displayed.

Figure 12:
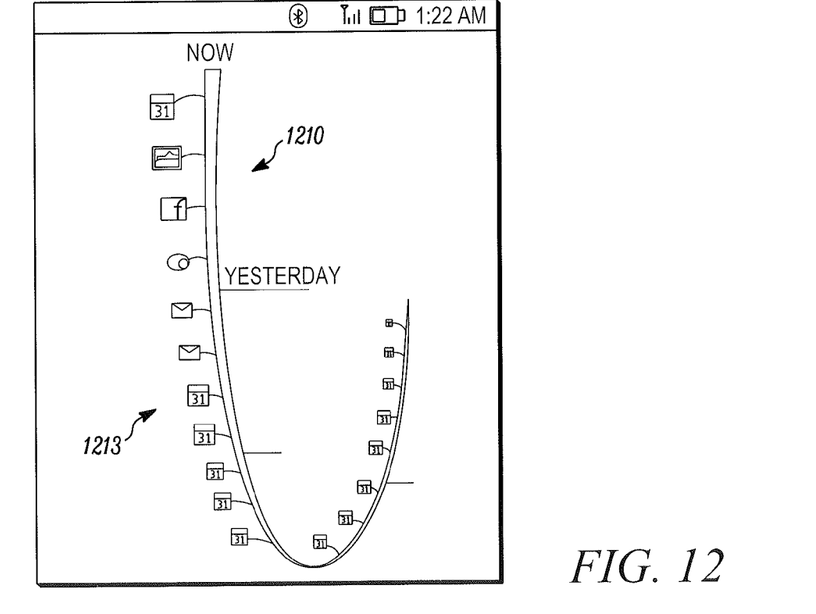
FIGS. 12-15 illustrate example screen shots of a timeline/event depiction in accordance with yet another alternate embodiment.
Figure 13:
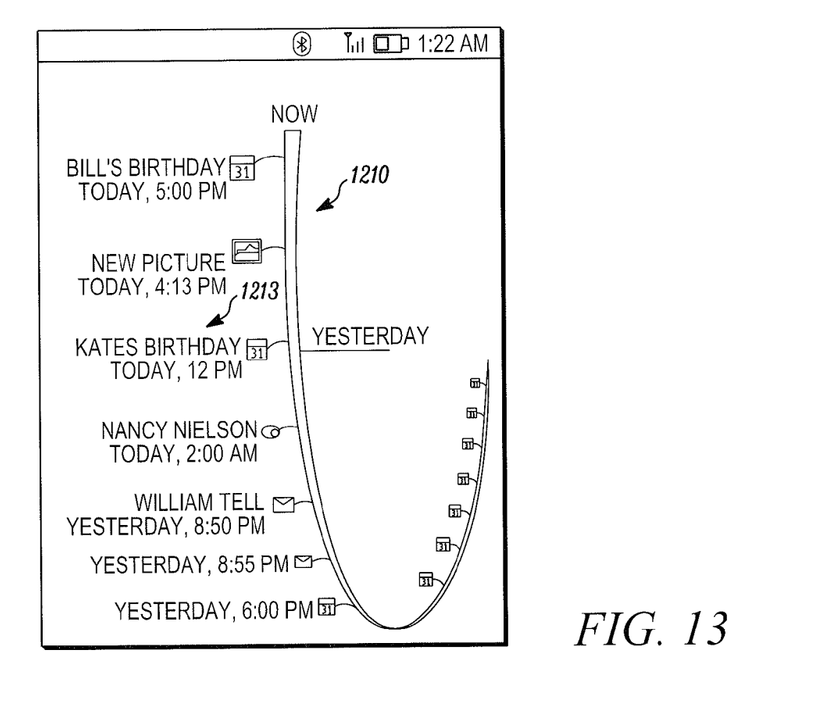
Figure 14:
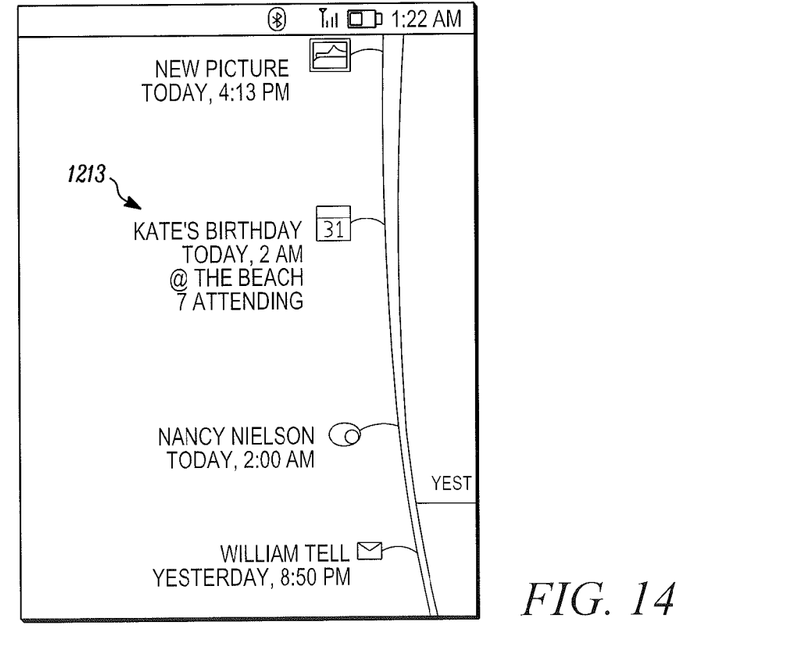
Figure 15:
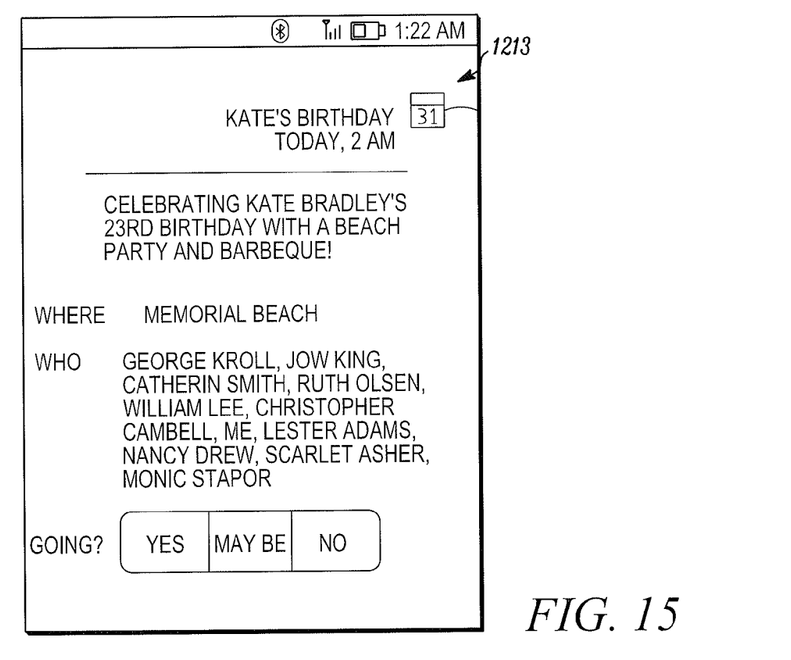

FIGS. 12-15 illustrate example screen shots of a timeline/event depiction in accordance with yet another alternate embodiment, at progressively higher levels of spatial zoom. In FIGS. 12-15, the user interface elements 1213 are distributed in a vertically oriented arc, with relatively older events appearing to recede into the distance, and with relatively newer events appearing closer to the user. In FIG. 12, timeline 1210 is shown at a first spatial zoom level, at which user interface elements 1213 associated with events include only an icon. In FIG. 13, timeline 1210 is shown at a relatively higher spatial zoom level, resulting in a depiction of fewer user interface elements 1213 along the arc path (e.g., because the arc path depicts a shorter temporal period than in FIG. 12), but with each user interface element 1213 including more attribute information. Similarly, in FIG. 14, timeline 1210 is shown at an even higher spatial zoom level, again resulting in a depiction of fewer user interface elements 1213, and more attribute information for each user interface element 1213. Finally, FIG. 15 depicts timeline 1210 at an even higher spatial zoom level, at which only a single user interface element 1213 (with relatively more attribute information) is displayed.

Figure 16:
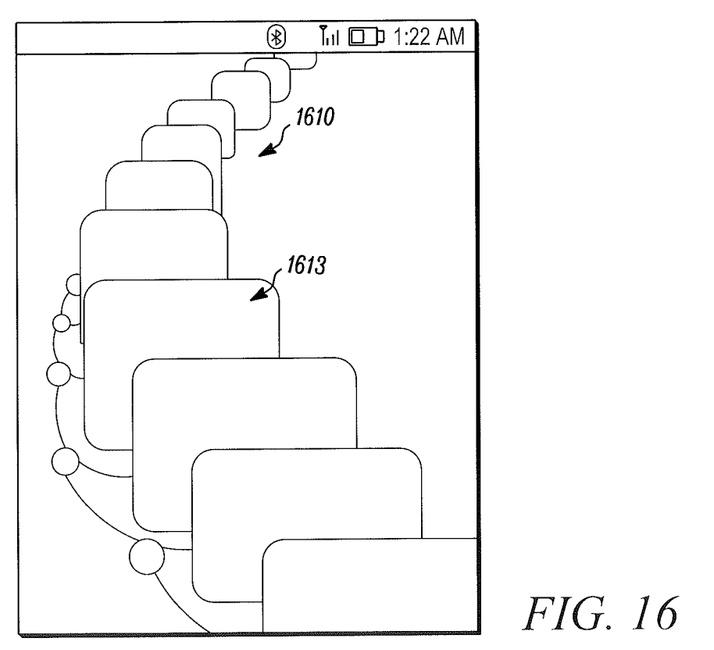
FIGS. 16-17 illustrate example screen shots of a timeline/event depiction in accordance with yet another alternate embodiment.
Figure 17:
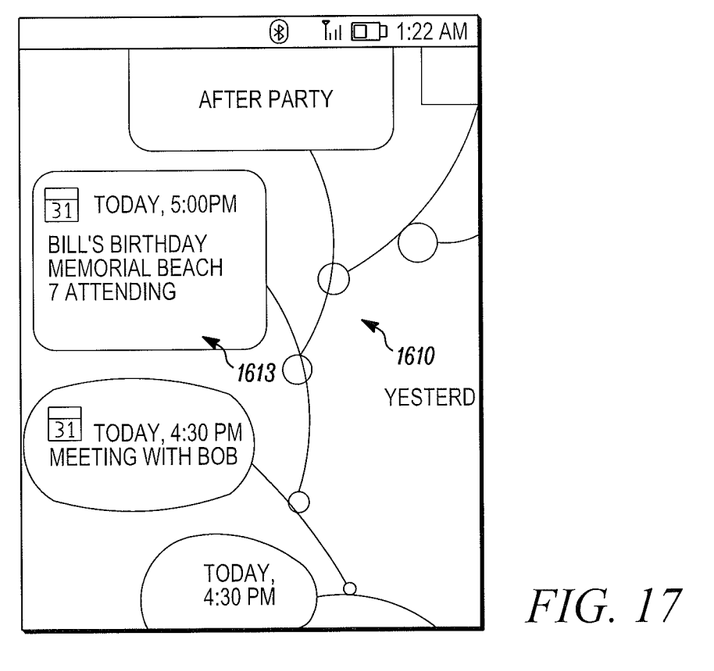

FIGS. 16 and 17 illustrate example screen shots of a timeline/event depiction in accordance with yet another alternate embodiment, at progressively higher levels of spatial zoom. In FIGS. 16 and 17, relatively older user interface elements 1613 again appear to recede into the distance (e.g., similar to FIGS. 9-11). However, in contrast to previously-described embodiments, the user interface elements 1613 are depicted as being arranged along an interlocking timeline 1610, where the combination of user interface elements 1613 and the timeline 1610 roughly resemble a handheld paper fan in which each user interface element 1613 is disposed on a slat of the fan, and the slats are connected (via their respective connectors) to an elongated pivot of the fan (i.e., the timeline 1610). According to an embodiment, the user interface elements 1613 are capable of articulating in various manners with respect to each other in response to user input, meaning that the user interface elements 1613 may be displayed with changeable apparent, relative relationships to each other and to the timeline 1610. As mentioned above, the embodiment of FIGS. 16 and 17 depicts user interface elements 1613 and timeline 1610 in a manner that resembles a paper fan, and the system may be configured to process various user inputs (e.g., user selection of and movement of a particular user interface element 1613) in a manner that causes one or more user interface elements 1613 to appear to change its relative relationship to other user interface elements 1613. In other embodiments, user interface elements may be depicted as being arranged in relative relationships to each other and to the timeline that represent other physical structures, such as a paper lantern, a twisting structure, a helical structure, and so on. In each instance, user inputs may be processed to depict articulation of the various user interface elements.

Figure 18:
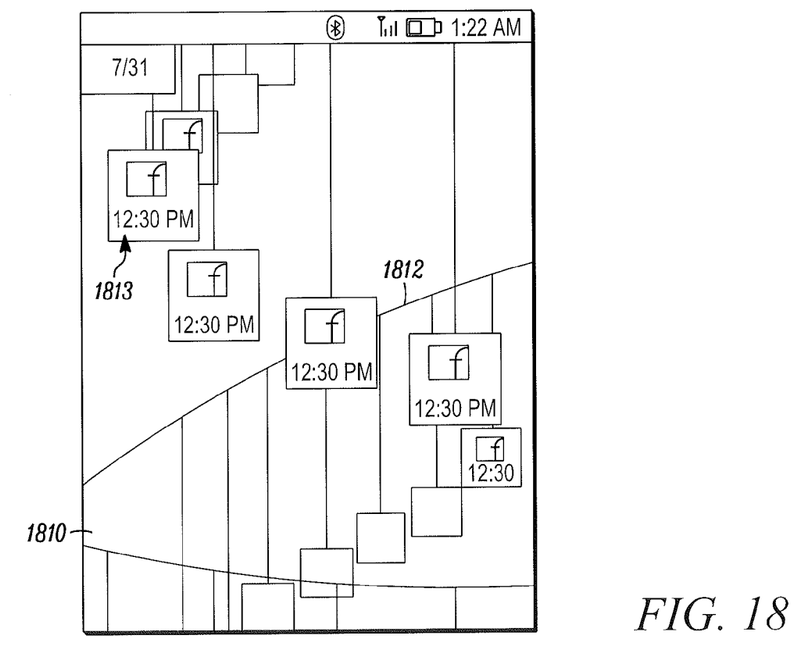
FIGS. 18-19 illustrate example screen shots of a timeline/event depiction in accordance with yet another alternate embodiment.
Figure 19:
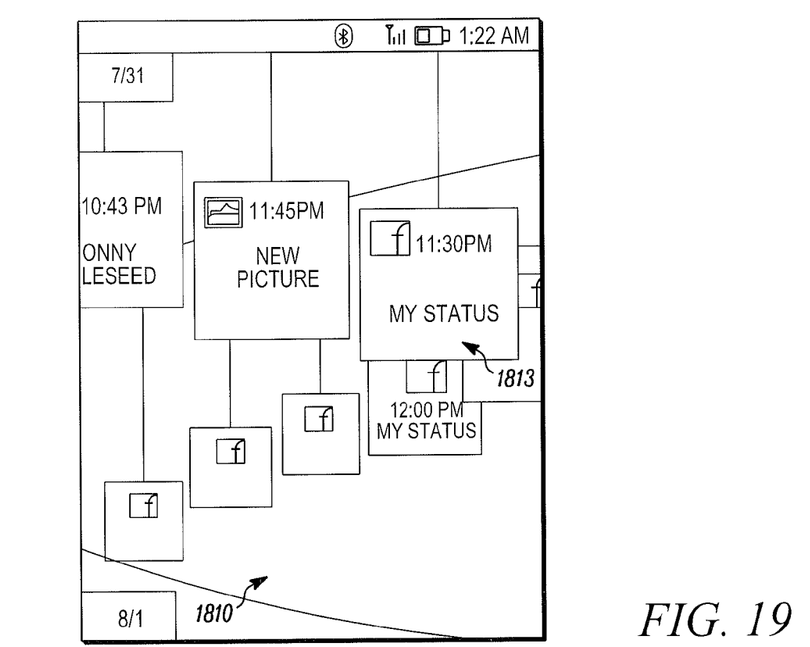

FIGS. 18 and 19 illustrate example screen shots of a timeline/event depiction in accordance with yet another alternate embodiment, at progressively higher levels of spatial zoom. In FIGS. 18 and 19, the user interface elements 1813 are distributed along a vertically oriented helix 1810. Each element 1813 is connected by a vertical element to the central helical spine 1812. As shown, the relative size of each element 1813 varies depending upon its apparent z-axis location (e.g., elements 1813 that are connected to points of the helical spine 1812 that are closer to the user are relatively larger). In an embodiment, the relative brightness of the displayed elements 1813 also may be varied (e.g., elements 1813 that are connected to points of the helical spine 1812 that are closer to the user are relatively brighter), consistent with reflected light from a source close to the user.

In an embodiment, a timeline is represented by a displayed parametric or parabolic curve that corresponds with a temporal range. A sequence of temporally-based elements that occur within the temporal range are attached to points along the curve in a chronological order of occurrence. Elements having temporal attributes that correspond to current and temporally-proximate events may be displayed so that they connect to closer-appearing points along the curve, and elements having temporal attributes that correspond to less proximate, future events may be displayed so that they connect to farther-appearing points along the curve (e.g., future events are depicted as fading into the screen). In a further embodiment, a front point (e.g., a point that appears closest to the user) of the parametric or parabolic curve may correspond with a selected time (e.g., the current time). The user may manipulate the user interface to select future events and move them forward along the curve to adjust the time span covered by the curve.

The events in the forefront of the curve may be represented with more expanded information content (e.g., relatively more displayed attributes), and the events toward the rear of the curve may be represented with more collapsed information content (e.g., relatively fewer displayed attributes). As events are moved forward and backward on the curve, the starting time and ending time corresponding to the front and rear points of the curve, respectively, are adjusted forward and backward in time, as well. As events displayed with expanded content are moved backward, the content may be collapsed (e.g., displayed with relatively fewer attributes), and as events displayed with more collapsed content are moved forward, the content may be expanded (e.g., displayed with relatively more attributes). In an embodiment, the start point and the end point of the curve (representing the most recent time and the earliest time covered by the timeline) may continue to be depicted on the screen so that and the user may access any point in the timeline using the user interface.

The time duration spanned by a timeline, and/or the spacing between user interface elements that represent events (e.g., elements 213, 613, 913, 1213, 1613, 1813) along a depicted timeline (e.g., any of timelines 210, 610, 910, 1210, 1610, 1810) may be different, in various embodiments. In one embodiment, for example, the spacing between event elements is proportional to the difference in temporal attributes for the events. For example, if event A occurs at 2:00 PM, and event B occurs at 2:16 PM, user interface elements for these two events may be placed very close to each other along a timeline. For example, a "time unit" along the timeline may correspond to ten minutes, and at a first spatial zoom level, event B may be depicted to be spaced approximately two time units away from event A (e.g., indicating that event B occurs approximately twenty minutes after event A). If an event C happens at 4:00 PM, the user interface element for event C may be spaced relatively farther from the user interface element for event B than the spacing between user interface elements for events A and B. According to the previous example, at the first spatial zoom level, event C may be depicted to be spaced approximately twelve time units away from event A. At different spatial zoom levels, the relative spacing between events may be different (e.g., the spacing may indicate slightly longer or shorter differences between the times that the events occur). For example, as indicated above, at a first spatial zoom level, events A and B may appear to occur two time units away from each other (e.g., they appear to occur twenty minutes apart). At a higher, second spatial zoom level, events A and B may appear to occur 1.5 time units away from each other (e.g., they appear to occur fifteen minutes apart). Conversely, at a lower, third spatial zoom level, events A and B may appear to occur at a same point along the timeline. Because the actual time difference between the events is sixteen minutes (i.e., the difference between 2:00 PM and 2:16 PM), the relative spacing between events A and B at the higher, second spatial zoom level may enable a user more accurately to determine the actual time difference between events (e.g., because 1.5 time units corresponds to fifteen minutes, which is closer to the actual difference in time between events of sixteen minutes). Conversely, the relative spacing between events A and B at the lower, third spatial zoom level may enable the user to less accurately determine the actual time difference between events (e.g., because the coincident occurrence of events A and B along the timeline may be interpreted to mean that they occur at the same time). Accordingly, in the above described embodiment, adjustments to the displayed, relative spacing between events may depict the differences in time between events to be more accurately indicated at progressively higher spatial zoom levels. In other embodiments, adjustments to the relative spacing at progressively higher spatial zoom levels may be made, although they may not necessarily depict time differences between events more accurately.

In another embodiment, each of the user interface elements representing events are arranged equally spaced along the timeline, regardless of the actual, relative temporal attributes or time stamps (e.g., in the foregoing example, the user interface elements for events A, B, and C would be equally spaced along the timeline). In yet another embodiment, the time duration covered by a timeline may be fixed (e.g., the time duration for a given timeline may be 24 hours). When there are too many user interface elements to display in an unambiguous (e.g., non-overlapping) manner along the timeline, some of the user interface elements may be suitably distributed to another timeline (e.g., along a parallel axis or axes).

In yet another embodiment, a minimal and maximal bounding distance may be employed between user interface elements, which may result in a dynamic adjustment of the scaling or spacing between the elements. For example, a minimal bounding distance may be 30 minutes (or some other value), and a maximal bounding distance may be 24 hours (or some other value). In such an embodiment, if event A occurs at 2:00 PM, and event B occurs at 2:02 PM, user interface elements for these two events may be drawn such that the user interface element for event B connects to the timeline at a point that corresponds to 2:30 PM (e.g., since the minimum bounding distance is 30 minutes, and 30 minutes from 2:00 PM is 2:30 PM). If event C happens at 4:00 PM that same day, the automatic scaling maintains the relative relationship of these events so the user can easily understand that events A and B happen closer in time than events B and C. However, if event C occurs at 4:00 the next day (or even later), the system may not base the spacing between events B and C on the actual time difference between events. Instead, with a maximum bounding distance of 24 hours, the user interface element for event C may be connected to the timeline at a point that corresponds to 24 hours from event B. Later (e.g., when a new day starts), event C may be fixed in its correct position along the timeline.

The user interface embodiments described above contemplate that the user may be provided a form of immersion or "virtual reality" experience in the sense that he or she may move through a 3D space, along the timeline, to inspect user interface elements corresponding to each event. Alternatively, the user interface may be allowed to "move" the timeline itself, bringing it closer and/or causing it to translate (e.g., within a plane parallel to the display screen surface).

Various other user interface interactivity may be incorporated into the user interface, in other embodiments. For example, a user interface element may be displayed as an icon presented along the timeline according to its temporal attribute. When a user selects the icon, the temporal attribute (and/or other attributes) may be revealed. Further inputs from the user may result in additional attribute information being revealed.

In one embodiment, events depicted along a timeline may include telephone call events (e.g., calls placed, calls received, missed calls, and so on), where the temporal event attribute is the time and date of the call. The call event user interface element may include a link which, when selected, launches a phone application to call a telephone number associated with the event (e.g., to redial a number or to call back a calling party associated with a missed call). In addition or alternatively, the call event user interface element may include a link that launches a text message application which, when selected, enables the user to send a text message to the telephone number associated with the event.

In another embodiment, events depicted along a timeline may include social networking events (e.g., a posting), where the temporal attribute is a date and time that the event (e.g., the posting) occurred. In yet another embodiment, events depicted along a timeline include calendar events (e.g., alarms, meetings, appointments, and so on), where the temporal attribute is a date and time of the event. In yet another embodiment, events depicted along a timeline may include electronic messages, where the temporal attribute is a date and time that the message was sent or received by the device. A number of other types of events also may be represented, in various other embodiments (e.g., photographs, video clips, email messages, and so on).

An embodiment includes a computer-implemented method for providing a user interface. The method includes causing a timeline to be displayed on a display screen of a device, and causing one or more user interface elements to be displayed along the timeline, where each user interface element is associated with an event that is characterized by one or more event attributes, including a temporal attribute, each user interface element is displayed in a position along the timeline that is based on the temporal attribute, and each user interface element is displayed with a visual representation of a first set of the event attributes. The method further includes receiving a user input, and performing, based on the user input, a modification of at least one of a spatial zoom level and a displayed position along the timeline of a user interface element. The method further includes causing, based on the modification, at least one of the user interface elements to be displayed with a visual representation of a second set of event attributes that is different from the first set of event attributes.

In a further embodiment, the user input indicates an increase in the spatial zoom level, and the visual representation of the first set of event attributes includes an icon indicating a type attribute for the event, and the visual representation of the second set of event attributes includes the temporal attribute indicating a time and a date for the event. In a still further embodiment, the method includes receiving a further user input, which causes the spatial zoom level to increase further, and in response to receiving the further user input, causing a third set of event attributes to be displayed which visually represents additional event attributes.

In a further embodiment, an event attribute includes an event type attribute that is selected from a group consisting of a telephone call event, a social networking event, a calendar event, a text event, an email event, a message event, a photograph event, and a video event. In another further embodiment, the timeline is linear, and the plurality of user interface elements are distributed along the timeline in a chronological order.

In an alternate, further embodiment, the timeline is a curve, and the plurality of user interface elements are distributed along the timeline in a chronological order. In a still further embodiment, a user interface element for an event having a relatively current temporal attribute is connected to a point at a forefront of the curve, and user interface elements having future temporal attributes are connected to points at back portions of the curve. In a still further embodiment, user interface elements connected toward the forefront of the curve are displayed with relatively more displayed event attributes, and user interface elements connected toward the back portions of the curve are displayed with relatively fewer displayed event attributes, and as events are moved forward and backward on the curve in response to user inputs, the starting time of the curve shifts forward and backward in time, and the user interface elements move forward and backward in time, respectively.

In a further embodiment, the plurality of user interface elements are displayed within a series of strips distributed along an axis perpendicular to the strips. In another further embodiment, an apparent depth of each user interface element is based on the temporal attribute. In yet another further embodiment, the spatial zoom level is dependent on a time duration of a portion of the timeline that the user has selected for display. In yet another further embodiment, causing the timeline to be displayed comprises causing a timeline to be displayed in a format selected from a group consisting of a line, a curve, and a strip.

In yet another further embodiment, receiving the user input includes receiving a user input selected from a group consisting of a swiping motion of a manipulator in a particular direction along a touchscreen, a pinching or spreading motion of multiple manipulators on the touchscreen, a gestural input on the touchscreen, one or more tapping inputs of the manipulator on the touchscreen, a movement of a cursor control device, a click of a cursor control device button, and a button click and drag of the cursor control device. In yet another further embodiment, the event attributes for an event are selected from a group consisting of the temporal attribute, an event type attribute, an event name attribute, an event originator attribute, an event subject attribute, an event location attribute, and an event description attribute.

Another embodiment includes an electronic device having a user interface configured to accept user inputs from a user, a display screen, and a processor coupled to the display screen and the user interface. The processor is configured to execute a set of software instructions that cause the display screen to display a timeline, and cause the display screen to display one or more user interface elements along the timeline, where each user interface element is associated with an event that is characterized by one or more event attributes, including a temporal attribute, and where each user interface element is displayed with a visual representation of a first set of the event attributes, and where each user interface element is positioned along the timeline based on the temporal attribute. Based on a user input to the user interface, the software instructions also cause the display screen to modify display of at least one of a position along the timeline of one or more of the user interface elements and a spatial zoom level, and based on the user input, cause the display screen to display at least one of the user interface elements with a visual representation of a second set of event attributes that is different from the first set of event attributes.

In a further embodiment, causing the display screen to display the timeline includes causing the display screen to display a timeline in a format selected from a group consisting of a line, a curve, and a strip. In another further embodiment, the display screen and the user interface are incorporated into a touchscreen. In yet another further embodiment, receiving the user input includes receiving a user input selected from a group consisting of a swiping motion of a manipulator in a particular direction along a touchscreen, a pinching or spreading motion of multiple manipulators on the touchscreen, a gestural input on the touchscreen, one or more tapping inputs of the manipulator on the touchscreen, a movement of a cursor control device, a click of a cursor control device button, and a button click and drag of the cursor control device. In yet another further embodiment, the spatial zoom level is dependent on a time duration of a portion of the timeline that the user has selected for display. In yet another further embodiment, the electronic device is a device selected from a group consisting of a cellular phone, a personal data assistant, a Global Positioning System device, a geolocation device, a navigation device, an e-book reader, a portable entertainment device, a computer, a point-of-sale device, a gaming device, and a pen pad.

The foregoing detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to touch screen displays, user interface components, and the like, need not be described herein. While at least one example embodiment has been presented in the foregoing detailed description, a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A computer-implemented method for providing a user interface comprising:
    causing a timeline to be displayed on a display screen of a device;
    causing one or more user interface elements to be displayed along the timeline, wherein each user interface element is associated with an event that is characterized by one or more event attributes, including a temporal attribute, each user interface element is displayed in a position along the timeline that is based on the temporal attribute, and each user interface element is displayed with a visual representation of a first set of the event attributes;
    receiving a user input;
    performing, based on the user input, a modification of at least one of a spatial zoom level and a displayed position of a user interface element along the timeline of the user interface element, whereby different positions along the timeline cause the user interface element to assume spatial zoom levels revealing different attributes according to the relative position along the time line; and
    causing, based on the modification, at least one of the user interface elements to be displayed with a visual representation of a second set of event attributes that is different from the first set of event attributes.

2. method of claim 1, wherein the user input indicates an increase in the spatial zoom level, and wherein the visual representation of the first set of event attributes includes an icon indicating a type attribute for the event, and wherein the visual representation of the second set of event attributes includes the temporal attribute indicating a time and a date for the event.

3. The method of claim 2, further comprising:
    receiving a further user input, which causes the spatial zoom level to increase further; and
    in response to receiving the further user input, causing a third set of event attributes to be displayed which visually represents additional event attributes.

4. The method of claim 1, wherein an event attribute includes an event type attribute that is selected from a group consisting of a telephone call event, a social networking event, a calendar event, a text event, an email event, a message event, a photograph event, and a video event.

5. The method of claim 1, wherein the timeline is linear, and the plurality of user interface elements are distributed along the timeline in a chronological order.

6. The method of claim 1, wherein the timeline is a curve, and the plurality of user interface elements are distributed along the timeline in a chronological order.

7. The method of claim 6, wherein a user interface element for an event having a relatively current temporal attribute is connected to a point at a forefront of the curve, and user interface elements having future temporal attributes are connected to points at back portions of the curve.

8. The method of claim 7, wherein user interface elements connected toward the forefront of the curve are displayed with relatively more displayed event attributes, and user interface elements connected toward the back portions of the curve are displayed with relatively fewer displayed event attributes, and as events are moved forward and backward on the curve in response to user inputs, the starting time of the curve shifts forward and backward in time, and the user interface elements move forward and backward along the timeline, respectively.

9. The method of claim 1, wherein the plurality of user interface elements are displayed within a series of strips distributed along an axis perpendicular to the strips.

10. The method of claim 1, wherein an apparent depth of each user interface element is based on the temporal attribute.

11. The method of claim 1, wherein the spatial zoom level is dependent on a time duration of a portion of the timeline that the user has selected for display.

12. The method of claim 1, wherein causing the timeline to be displayed comprises causing a timeline to be displayed in a format selected from a group consisting of a line, a curve, and a strip.

13. The method of claim 1, wherein receiving the user input includes receiving a user input selected from a group consisting of a swiping motion of a manipulator in a particular direction along a touchscreen, a pinching or spreading motion of multiple manipulators on the touchscreen, a gestural input on the touchscreen, one or more tapping inputs of the manipulator on the touchscreen, a movement of a cursor control device, a click of a cursor control device button, and a button click and drag of the cursor control device.

14. The method of claim 1, wherein the event attributes for an event are selected from a group consisting of the temporal attribute, an event type attribute, an event name attribute, an event originator attribute, an event subject attribute, an event location attribute, and an event description attribute.

15. An electronic device comprising:
    a user interface configured to accept user inputs from a user;
    a display screen;
    a processor coupled to the display screen and the user interface, the processor configured to execute a set of software instructions that:
    cause a timeline to be displayed on the display screen;
    cause one or more user interface elements to be displayed along the timeline, wherein each user interface element is associated with an event that is characterized by one or more event attributes, including a temporal attribute, each user interface element is displayed in a position along the timeline that is based on the temporal attribute, and each user interface element is displayed with a visual representation of a first set of the event attributes;

perform, based on the user input, a modification of at least one of a spatial zoom level and a displayed position along the timeline of a user interface element; and cause, based on the modification, at least one of the user interface elements to be displayed with a visual representation of a second set of event attributes that is different from the first set of event attributes.

16. The electronic device of claim 15, wherein the timeline is displayed in a format selected from a group consisting of a line, a curve, and a strip.

17. The electronic device of claim 15, wherein the display screen and the user interface are incorporated into a touchscreen.

18. The electronic device of claim 15, wherein receiving the user input includes receiving a user input selected from a group consisting of a swiping motion of a manipulator in a particular direction along a touchscreen, a pinching or spreading motion of multiple manipulators on the touchscreen, a gestural input on the touchscreen, one or more tapping inputs of the manipulator on the touchscreen, a movement of a cursor control device, a click of a cursor control device button, and a button click and drag of the cursor control device.

19. The electronic device of claim 15, wherein the spatial zoom level is dependent on a time duration of a portion of the timeline that is being displayed.

20. The electronic device of claim 15, wherein the electronic device is a device selected from a group consisting of a cellular phone, a personal data assistant, a Global Positioning System device, a geolocation device, a navigation device, an e-book reader, a portable entertainment device, a computer, a point-of-sale device, a gaming device, and a pen pad.

* * * * *